United States Patent [19]
Shen et al.

[11] Patent Number: 5,862,140
[45] Date of Patent: Jan. 19, 1999

[54] METHOD AND APPARATUS FOR MULTIPLEXING VIDEO PROGRAMS FOR IMPROVED CHANNEL UTILIZATION

[75] Inventors: Paul Shen, San Francisco; Edward A. Krause, El Cerrito; Adam S. Tom, San Francisco, all of Calif.

[73] Assignee: Imedia Corporation, San Francisco, Calif.

[21] Appl. No.: 560,219

[22] Filed: Nov. 21, 1995

[51] Int. Cl.⁶ .................................. H04J 3/14; H04N 7/26
[52] U.S. Cl. ........................... 370/468; 370/538; 348/387
[58] Field of Search ................................... 348/423, 845, 348/845.2, 387, 385; 320/465, 468, 536–538; 395/200.47

[56] References Cited

U.S. PATENT DOCUMENTS

| | | | |
|---|---|---|---|
| 4,455,649 | 6/1984 | Esteban et al. | 370/80 |
| 4,477,900 | 10/1984 | Gruenberg | 370/112 |
| 4,494,232 | 1/1985 | Dambrackas et al. | 370/80 |
| 4,639,909 | 1/1987 | Nirschl et al. | 370/58 |
| 4,975,771 | 12/1990 | Kassatly | 358/146 |
| 5,115,309 | 5/1992 | Hang | 358/133 |
| 5,144,425 | 9/1992 | Joseph | 358/133 |
| 5,146,564 | 9/1992 | Evans et al. | 395/250 |
| 5,216,503 | 6/1993 | Paik et al. | 358/133 |
| 5,241,383 | 8/1993 | Chen et al. | 358/136 |
| 5,289,470 | 2/1994 | Chang et al. | 370/94.1 |
| 5,291,281 | 3/1994 | Paik et al. | 348/384 |
| 5,319,457 | 6/1994 | Nakahashi et al. | 348/387 |
| 5,355,372 | 10/1994 | Sengputa et al. | 370/60.1 |

(List continued on next page.)

FOREIGN PATENT DOCUMENTS

| | | | |
|---|---|---|---|
| 0 382 892 | 8/1990 | European Pat. Off. | H04N 7/13 |
| 0 515 101 A2 | 11/1992 | European Pat. Off. | H04N 7/13 |
| 0 562 221 A1 | 9/1993 | European Pat. Off. | H04N 5/907 |
| 0 577 329 A2 | 1/1994 | European Pat. Off. | H04N 7/13 |
| 0 625 857 A1 | 11/1994 | European Pat. Off. | H04N 7/173 |
| 0 627 858 A2 | 12/1994 | European Pat. Off. | H04N 7/13 |
| 0 653 885 A1 | 5/1995 | European Pat. Off. | H04N 7/173 |
| 0 661 885 A1 | 7/1995 | European Pat. Off. | H04N 7/26 |
| 0 690 626 A2 | 1/1996 | European Pat. Off. | H04N 7/173 |
| 0 705 042 A2 | 4/1996 | European Pat. Off. | H04N 7/58 |
| 0 711 077 A2 | 5/1996 | European Pat. Off. | H04N 7/24 |
| 63-092140 A | 4/1988 | Japan | H04L 11/20 |
| 63-222592A | 9/1988 | Japan | H04N 7/13 |
| 5-64175 | 3/1993 | Japan | H04N 7/13 |
| 05 095340 A | 4/1993 | Japan | H04J 3/22 |
| 2 289 194 | 11/1995 | United Kingdom | H04J 3/16 |
| WO 95/29559 | 2/1995 | WIPO | H04N 7/12 |
| WO 95/26103 | 9/1995 | WIPO | H04N 5/76 |

OTHER PUBLICATIONS

U. Riemann, "Der MPEG–2–Standard Generische Codiersche für Bewegtbilder und zugehöriger Audio–Information—Multiplex–Spezifikation für die flexible Übertragung digitaler Datenströme (Teil 5_2)," Fernseh–und Kino–Technik, vol. 48, No. 10, pp. 545–553 (Oct. 1994), XP000468290.

Perkins, M and D. Arnstein, "Statistical Multiplexing of Multiple MPEG–2 Video Programs in a Single Channel," SMPTE Journal, 104 (1995) Sep., No. 9, pp. 596–599, XP000523229.

(List continued on next page.)

*Primary Examiner*—Victor R. Kostak
*Attorney, Agent, or Firm*—McCutchen, Doyle, Brown & Enersen, LLP

[57] ABSTRACT

A method and apparatus multiplexing several encoded program streams into a single multiplex suitable for transmission over a data channel, the streams typically including video and audio. According to one embodiment of the invention, high data channel utilization is achieved by determining the order of sending data packets of program streams into the data channel. According to this embodiment, whenever data is to be sent into the data channel, a determination is made of which packet to send or append to the multiplex, said determination by selecting a channel that has a decoder buffer that is not approaching a full state, and said next packet is appended to said multiplex. The method further includes selecting a channel that substantially balances the decoder buffers of the decoders with which the program streams are decodeable.

43 Claims, 5 Drawing Sheets

U.S. PATENT DOCUMENTS

| | | | |
|---|---|---|---|
| 5,361,096 | 11/1994 | Ohki et al. | 348/387 |
| 5,434,848 | 7/1995 | Chimento, Jr. et al. | 370/468 |
| 5,457,688 | 10/1995 | Andersen | 370/85.8 |
| 5,506,844 | 4/1996 | Rao et al. | 370/84 |
| 5,515,368 | 5/1996 | Saito et al. | 370/468 |
| 5,541,919 | 7/1996 | Yang et al. | 370/61 |
| 5,550,589 | 8/1996 | Shiojiri et al. | 348/387 |
| 5,550,590 | 8/1996 | Sakazawa et al. | 348/387 |
| 5,566,174 | 10/1996 | Sato et al. | 370/84 |
| 5,568,476 | 10/1996 | Sherer et al. | 370/60 |
| 5,603,058 | 2/1997 | Belknap et al. | 395/855 |
| 5,640,388 | 6/1997 | Woodhead et al. | 370/468 |
| 5,663,962 | 9/1997 | Caire et al. | 370/536 |
| 5,691,986 | 11/1997 | Pearlstein | 370/477 |

OTHER PUBLICATIONS

Haskell, B.G., and Reibman, A.R. (1994) "Multiplexing of variable rate encoded streams." IEEE Transactions on circuits and Systems for Video Technology, (4)4, 417–424.

Puri, A. et al., "Temporal Resolution Scaleable Video Coding," IEEE (1994), Publication Date: Nov. 13, 1994, pp. (947–951), XP000522755.

Sun, Huifang and Wilson Kwok, "MPEG Video Coding with Temporal Salability," Publication Date: Jun. 18, 1995, pp. (1742–1746), XP000535047.

METHOD AND APPARATUS FOR MULTIPLEXING VIDEO PROGRAMS FOR IMPROVED CHANNEL UTILIZATION

I. BACKGROUND OF THE INVENTION

A. Field of the Invention

The field of the present invention is video compression.

B. Background

The present invention relates to the encoding, formatting, and distribution of compressed video programs. It is particularly, but not necessarily, applicable to a particular video compression technique known as variable bit-rate (VBR) encoding. VBR encoding can be used to overcome the well-known problem of most video compression encoders where the image quality tends to vary as a function of image complexity. Typically, a video program will contain a variety of scenes. Many of these scenes are lacking in motion or detail and are therefore easily compressed, while many other scenes contain complex details which are generally more difficult to compress, particularly when moving in a complex or random manner. Therefore, unless the available bandwidth is very high, the perceived quality of the decompressed and reconstructed images will tend to vary from one scene to the next. This problem becomes more serious as the available bandwidth is reduced until, eventually, the video quality becomes unacceptable, often because of just a few problem scenes.

VBR encoding overcomes this problem by allocating more bits to those scenes which are difficult to compress and fewer bits to those scenes which are more easily compressed. In this way, the decompressed and reconstructed images can be made to appear consistently uniform, and therefore superior to the reconstructed images derived from the constant bit-rate encoder adjusted for the same average rate of compression. As a result, it is possible to compress a video program more efficiently when using the VBR encoding technique. This not only increases the number and variety of programs or program streams that can be delivered over a fixed-bandwidth communication channel, but also reduces the storage capacity requirements at the head end or other site where the program library is maintained.

The disadvantage of the VBR encoding technique is that it presents certain problems when manipulating or editing the compressed bit-streams. In particular, it becomes difficult to efficiently utilize a fixed-bandwidth communication channel since the variable bit-rate stream may at times exceed the capacity of the channel, while at other times, it may utilize only a fraction of the available channel capacity. As would be clear to one in the art, the possibility of exceeding the capacity of the channel is not only a problem with VBR encoded data, this is also a problem with non VBR-encoded data. The present invention is applicable also to non VBR-encoded data.

One known technique that is used to alleviate this problem is to buffer the compressed bit-stream at the transmission end of the communication channel in order to convert the variable rate stream to a constant rate stream. In such a case, it is also necessary to buffer the signal received at the other end of the channel in order to recover the variable rate stream that is necessary for proper timing of the reconstructed video images. Unfortunately, the required amount of buffering would be prohibitively expensive and would introduce long delays into the distribution system. Moreover, existing video compression standards such as the MPEG standards, a set of International Organization for Standardization/International Electrotechnical Commission (ISO/IEC) standards, specify limits on the amount of buffering required for conforming decoders. Therefore, it is important that the received bit-streams be decodable without exceeding these limits.

Another prior art technique that can be used to reduce the inefficiency of transmitting VBR encoded (and non-VBR encoded) programs over a fixed-bandwidth channel combines a plurality of program streams into a single multiplex. Although each additional program stream will increase the overall data rate of the multiplex, the variance of the average per-stream data rate of this multiplex will tend to decrease in approximate proportion to the number of program streams, assuming approximate statistical independence of them. Therefore, if the nominal rate that can be accommodated by the channel is significantly greater than the average rate of a single program stream, then the channel utilization can be significantly improved. This technique is known in the art as statistical multiplexing.

When using buffering, one prior art method of assuring that buffer overflow does not occur is to add feedback between the encoder buffer and the encoder. When the buffer approaches a full state, a buffer fullness signal from the buffer informs the encoder to reduce the bit-rate so that the buffer does not overflow. When the buffer has more room, the feedback signal, from the buffer to the encoder, enables the encoder to increase the bit-rate in order to maintain image quality. Such feedback is particularly effective when combined with statistical multiplexing. In such a case, a single encoder buffer may be at the output of the multiplexer, and feedback from that buffer is to all the encoders of the programs being multiplexed. Because the multiplexing reduces effective per stream data rate variance, in general, less buffering would be required to convert the multiplex to a fixed bit-rate stream than if each individual encoder included a VBR-to-constant bit-rate buffer.

The combination of encoder buffering with statistical multiplexing with feedback for conveying encoded, particularly VBR encoded program streams over fixed-bandwidth channels can be effective, but generally may not be sufficient when efficient utilization of the entire channel is important.

In addition, there are often situations where no feedback is possible between the output buffer of the multiplexer and the individual encoders. One such situation occurs when multiplexing already encoded data streams. Another occurs when the encoders are located in an area physically remote from the multiplexer. Both these situations are referred to herein as remote encoding, indicating that encoding and multiplexing are remote in time, location, or otherwise, so that no feedback is possible from the multiplexer to the encoders of the program streams to be multiplexed.

In addition, one of the factors that limits the efficiency of transmitting the multiplex is the finite overall memory available for buffering at the decoder/demultiplexer. While statistical multiplexing usually provides sufficient benefit due to the small probability that all program streams will have complex scenes at the same time, there is still a finite chance of such peaks occurring. If the peaks are such that no more buffer space is available at the decoder, fill packets are sent, there is a delay, and the channel utilization (channel efficiency) goes down.

Thus, there is a need in the art for technology that can be used to deliver in an efficient manner compressed video programs of consistently uniform quality over existing communication and distribution infrastructure.

Thus, there also is a need for technology to multiplex several encoded video programs, applicable to both real time encoding and remote encoding situations.

Thus, there also is a need for technology to reduce the chance that a buffer overflow condition occurs at the decoder.

Thus, there also is a need for technology to reduce the chance that a buffer underflow condition occurs at the decoder.

Thus, there also is a need for technology for maximizing channel efficiency by avoiding sending fill packets of stuffing bits whenever possible.

II. SUMMARY OF THE INVENTION

A. Objects of the Invention

An object of the present invention is to provide a method and apparatus for efficiently delivering several compressed video programs over a communications channel.

Another object of the present invention is to provide a method and apparatus for multiplexing several encoded video programs, applicable to both real time encoding and remote encoding situations.

Another object of the invention is to provide a method (and apparatus) for reducing the chance that a buffer overflow condition occurs at the decoder.

Another object of the invention is to provide a method (and apparatus) for reducing the chance that a buffer underflow condition occurs at the decoder.

Another object of the invention is to provide a method (and apparatus) to maximize channel efficiency by not sending fill packets of stuffing bits when possible.

B. Overview of the Invention

The above and other objects of the invention are provided for in a multiplexing method (and apparatus) which achieves high data channel utilization by determining the order of sending data packets of program streams into the data channel. According to one embodiment, whenever data is to be sent into the data channel, the method determines which packet to send next by selecting a next channel that has a decoder buffer that is not approaching a full state. The method further includes selecting a channel that substantially balances the decoder buffers of the decoders with which the program streams are decodeable. In a further feature of that embodiment, balancing the decoder buffers includes keeping approximately the same time duration stored in each decoder buffer.

C. Related Inventions

Co-pending with the present application are our U.S. patent application Ser. No. 08/561,410 entitled "Method and Apparatus for Increasing Channel Utilization for Digital Video Transmission" and application Ser. No. 08/561,296 entitled "Method and Apparatus for Modifying Encoded Digital Video for Improved Channel Utilization," both filed concurrently with the present application, and incorporated herein by reference.

IV. DESCRIPTION OF THE PREFERRED EMBODIMENT

A. Introduction

The preferred embodiment of the invention utilizes the presently known technique of variable bit-rate ("VBR") encoding and decoding of video data, including soundtrack or audio data, and uses a compression method to reduce the total amount of data required to represent a video stream. The present invention, however, is applicable also to non-VBR encoded data, as would be clear to one in the art. Although the preferred embodiment uses the MPEG coding standard, the invention is applicable to many other coding methods, as also would be apparent to one in the art.

The following detailed description is made with reference to FIGS. 1–5, in which like reference numerals indicate identical elements throughout all of the figures.

For convenience, several terms used in describing the invention are defined in the Appendix entitled "An Introduction to Video Coding and MPEG." The Appendix also explains many of the concepts of coding and MPEG that may be needed to understand the presented invention. It should be noted that some of the terms in the terminology section of the Appendix may have more than one meaning in the art. The meaning applicable in this description would be clear from the text to one in the art.

B. Overall Architecture of the Preferred Embodiment

The invention deals with complete coded streams, including both video and audio. The preferred embodiment deals with MPEG streams of a single program. That is, MPEG encoded video, audio, and other data combined together as the MPEG stream of a single program. Such an MPEG stream is defined herein as a program stream.

Sometimes, details are provided herein only for dealing with the video stream component of the program stream as it is the determining or limiting part. In any case, how to process coded audio to be consistent with the method of the present invention would be straightforward to one in the art. Also, in all cases, realizing the present invention for streams coded by methods other than MPEG would be straightforward to one in the art.

Figure 1:
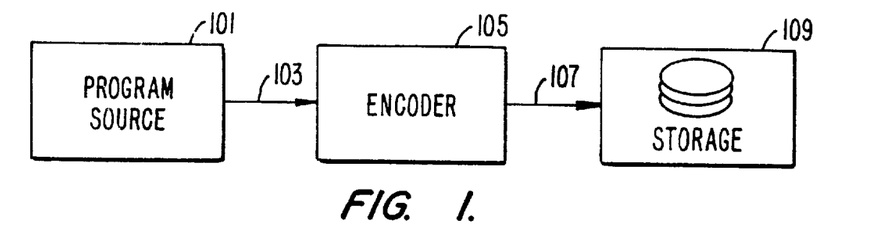
FIG. 1 shows an example of an encoding system.

An example of a video encoding system is shown in FIG. 1. Program source 101, such as a video tape recorder (VTR) or other program source, is used to supply uncompressed video 103 to an encoder 105. Encoder 105 receives uncompressed video 103 and applies a video compression process. In the preferred embodiment, the video compression is that specified by the MPEG-2 standard. Preferably, but not necessary for the invention, the video compression technique provides for a VBR mode that can be used to produce video streams that can be decoded to obtain images of substantially uniformly consistent quality. Many compression methods and standards, including MPEG, have such a VBR mode. Typically, the compressed output 107 of encoder 105 would be written to a digital storage medium (DSM) such as a disk or tape storage media 109 for playback at a later time, or transmitted directly to a data channel for broadcast or other transfer. That is, in the nomenclature of the MPEG standard, 109 is a DSM or channel.

Figure 2A:
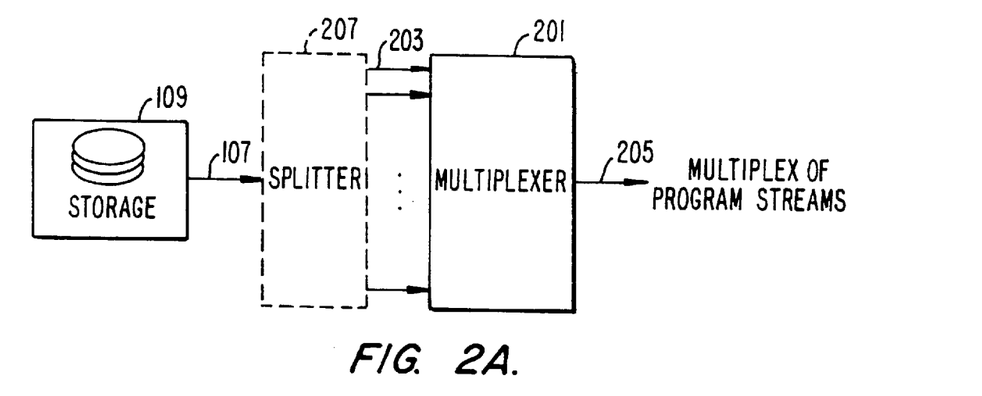
FIGS. 2A and 2B show systems for combining multiple compressed program streams into a single multiplex.
Figure 2B:
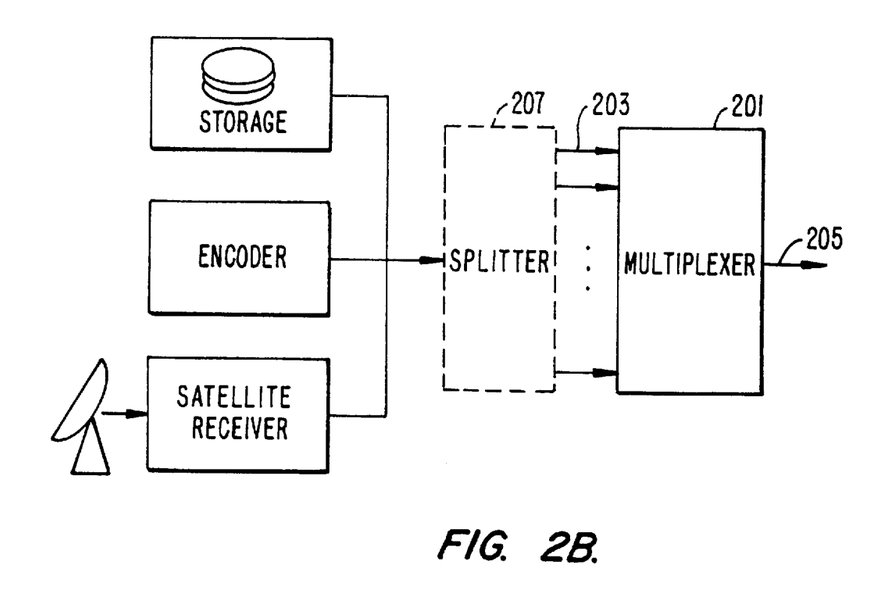

In the preferred embodiment of the present invention, multiple compressed program streams are combined into a single multiplex as shown in FIGS. 2A and 2B. The multiplexer 201 combines each of the program streams 203 retrieved from storage 109 or obtained from any other source, such as an encoder 209 and/or satellite receiver 211, into a single multiplex 205 that can either be broadcast immediately over the distribution system or returned to storage for broadcasting at a later time. One advantage of using the multiplexing process and apparatus, also called the combining process and apparatus, is to reduce the statistical variance in the video as compared to that of the individual VBR program streams 203. Additionally, the multiplexing method has the advantage of providing the viewer with a choice of retrieving or viewing any of the program streams contained in multiplex 205.

The multiplexing in the preferred embodiment is for a plurality of compressed program streams or for the case of transmitting several segments of a single data steam, such as a VBR or otherwise compressed program. In the single data stream case, one first partitions the compressed program into a plurality of segments using the splitter 207 shown in FIG. 2A. For example, some or all of program streams 203 combined by the multiplexer 201 could correspond to different segments of the same video program. By continuously transmitting the same multiplex of program segments over and over, it becomes possible for the receiver to eventually reconstruct the entire program by selecting and decoding a different program segment during each repetition of the multiplex. This technique is described in more detail in our co-pending U.S. patent application, application Ser. No. 08/326,511, filed Oct. 19, 1994 entitled "Method and Apparatus for Encoding and Formatting Data Representing a Video Program to Provide Multiple Overlapping Presentations of the Video Program," hereinafter referred to as "Our Video-On-Demand Invention" and incorporated herein by reference. One application of Our Video-On-Demand Invention is video-on-demand, where the user may choose to begin watching a program during any of a wide range of time intervals.

It should be noted, and it would be clear, that the multiplexing of multiplexer 201, according to the method of the invention, is not the multiplexing of packets of elementary streams into packs of an MPEG stream as described in the context of the MPEG standard in the Appendix, in Section D entitled "Audio/Video Synchronization and MPEG Receivers." It similarly should also be noted that in the case of using MPEG, a program stream in the context of this invention would usually be a complete pack-level MPEG stream.

Figure 3:
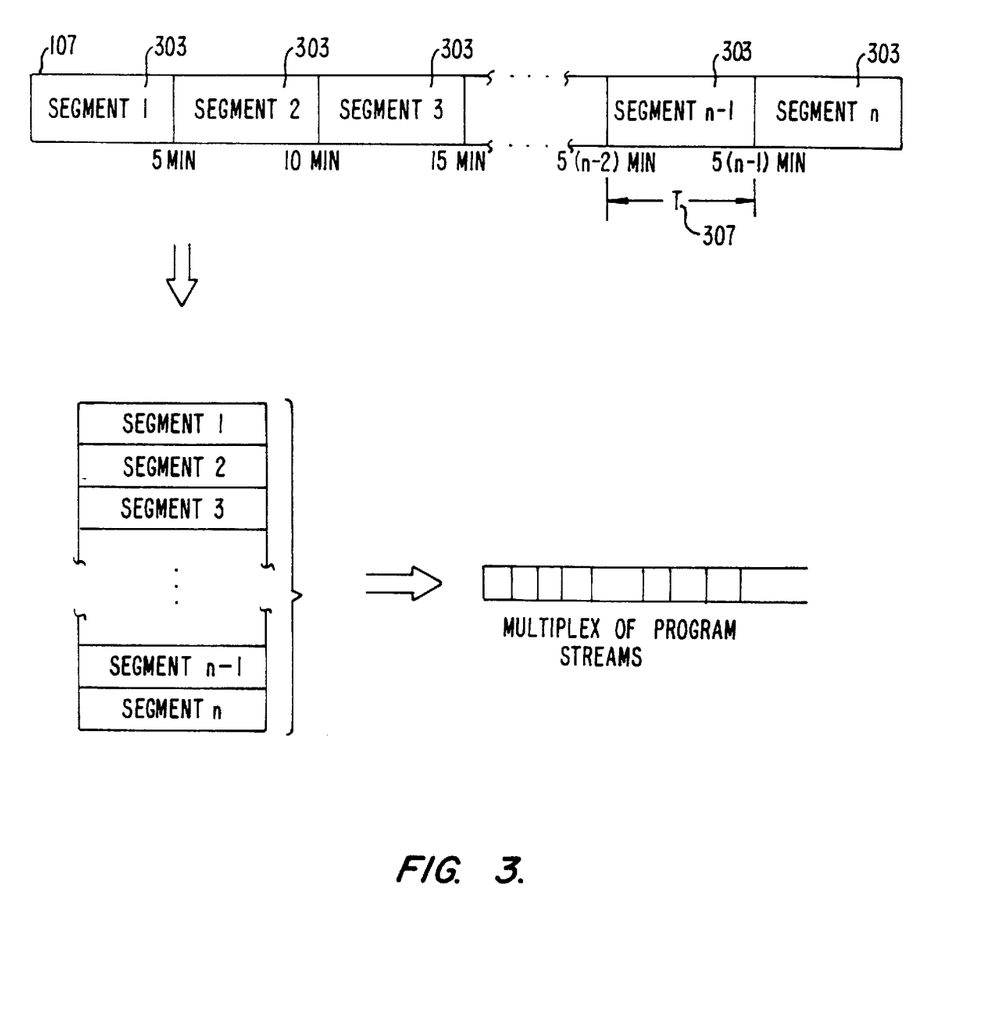
FIG. 3 shows the details of the video program stream, the n different segments, and the multiplexer output.

The splitting and multiplexing are shown in more detail in FIG. 3 for the case where program streams 203 correspond to different segments of the same video program and multiplexed output 205 is a multiplex of such different segments of the same video program. In the preferred embodiment of the present invention for the single original stream case, compressed program 107 is first split into a number, n, of segments 303 where each segment 305 corresponds to a fixed time interval 307 of length T seconds. In the example illustrated in FIG. 3, T, the time interval 307, is 300 seconds (5 minutes). When segments 303 are compressed using VBR techniques, the compression ratio is allowed to vary over time, and different segments may contain differing amounts of compressed data.

As shown in FIG. 3, in the segmented single-stream case, each of the n different segments 303 becomes an independent program stream, and each of these n independent program streams subsequently are aligned to start at the same time, herein referred to as "stacking up." The stacked-up program streams 203 are multiplexed together using multiplexer 201.

A variety of multiplexing techniques may be used in multiplexer 201 without deviating from the scope of this invention. Two such multiplexing techniques are included in Our Video-On-Demand Invention. In the first such previously disclosed method, each of the program streams 203 is partitioned into variable-size packets where each packet contains the compressed data corresponding to a fixed number of pixels. Recalling that each of the program streams 203 is of the same duration and hence represents the same number of pixels, it follows that each of the program streams 203 will contain the same number of packets after partitioning. Hence, a fixed interleaving scheme may be used when multiplexing the packets from each of the n segments.

In the second previously disclosed multiplexing method, each of the program streams 203 is partitioned into fixed-size packets and the number of packets in each stream is allowed to vary. Multiplexer 201 orders the packets according to the sequence in which they are to be decoded at the respective decoder. The last packet of each stream in set 203 may be padded or truncated.

In the preferred embodiment of this invention, the second above-mentioned scheme is used. That is, the original compressed program 107 is first partitioned into fixed-length packets, and, in the segmented stream case, is then split into segments by splitter 203. The advantage of this order is that the splitting of the program into segments by splitter 203 can be forced to occur at packet boundaries rather than at pixel boundaries.

Modifying this method for the case of multiplexing several video programs rather than segmenting a single stream before multiplexing would be clear to one in the art. Similarly, modifying for the hybrid case of multiplexing together segments of one or more programs with one or more independent video programs would also be clear to one in the art.

C. Detailed Description
Flow Chart for Balancing Decoder Buffers

The multiplexing method of the present invention assumes that all receivers that are "tuned" to a particular program stream use the same hypothetical decoder. Each such decoder has a single buffer used to receive data from a single selected stream. Thus, whenever sending data from a particular program stream, the multiplexing method effectively assumes the data will be sent along a particular communications channel including the tuned hypothetical decoder. The method of the present invention uses this assumption, for example, to estimate the fullness of the buffer of the hypothetical decoder corresponding to any stream to which the receiver containing the decoder is tuned. The word "receiver" as used herein means a receiving device which includes a decoder. The assumption about such hypothetical decoders does not necessarily restrict the type of decoders or receivers with which the method of the present invention works. Rather, the assumption is used by the multiplexer to make certain decisions. Different levels of modeling the decoders are possible within the scope of the invention.

One aim of the method of the present invention is to maximize channel efficiency by avoiding, whenever possible, the sending of fill packets of stuffing bits, while at the same time minimizing the chance that one decoder buffer will become full before the others. Avoiding fill packets increases efficiency since stuffing bits are ignored at the receiver. The method also minimizes errors by avoiding, whenever possible, an underflow of any of the decoder buffers.

Figure 4A:
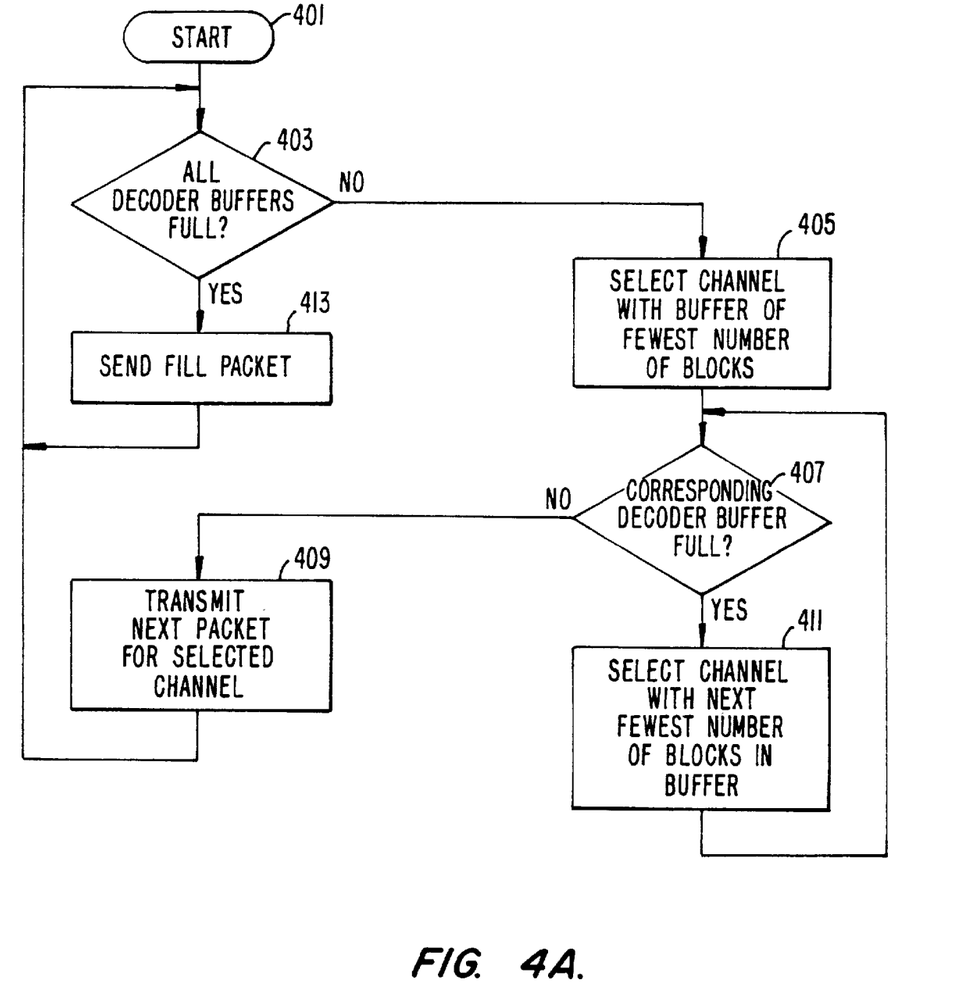
FIG. 4A shows a flow chart of the multiplexing method according to the preferred embodiment of the present invention.
Figure 4B:
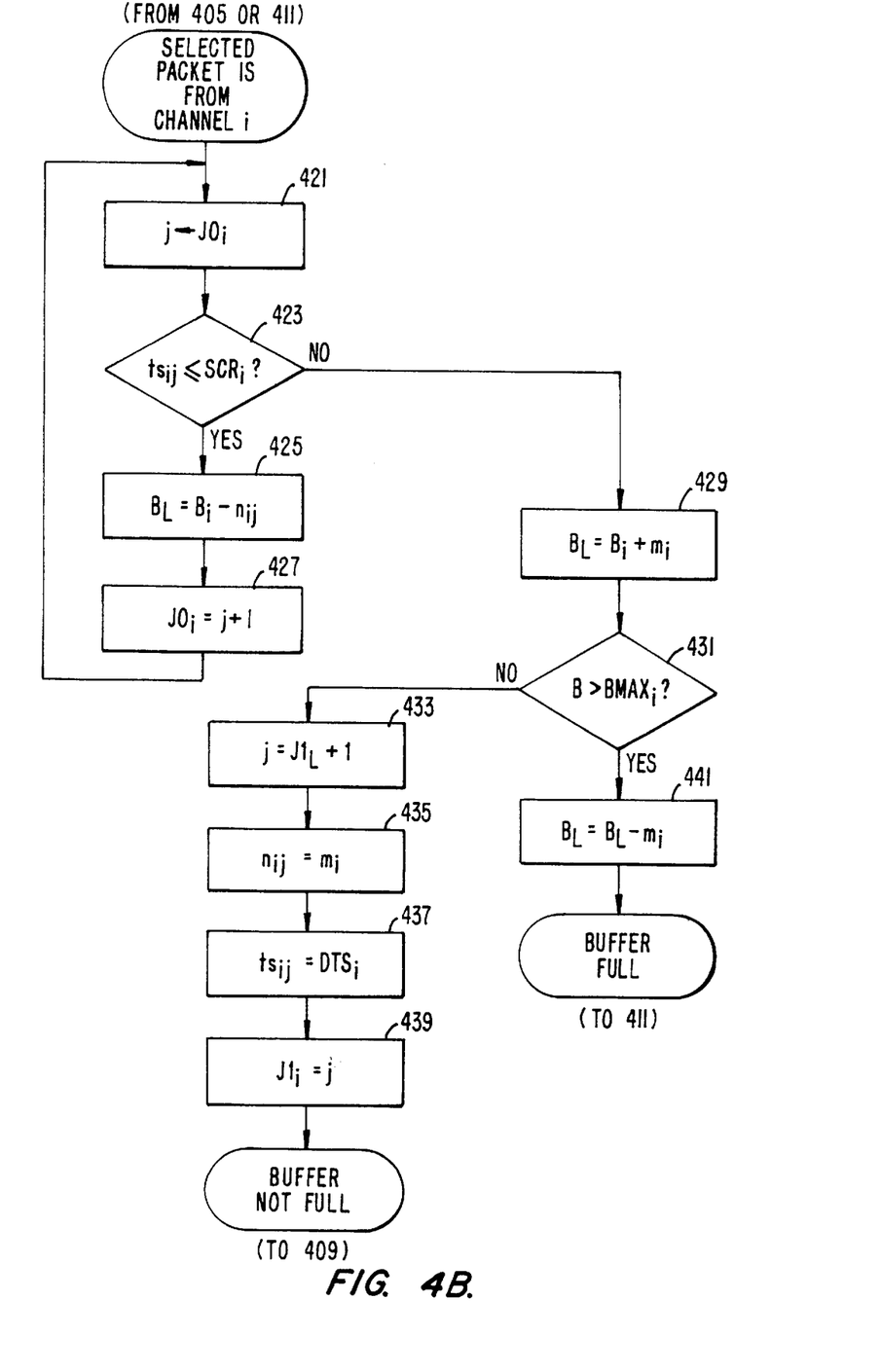
FIG. 4B shows a flow chart of the step of determining if a buffer is full in the multiplexing method, according to the preferred embodiment of the present invention.

The multiplexing method according to the preferred embodiment of the present invention is described with the aid of the flow charts shown in FIGS. 4A and 4B. Each of the program streams 203 is assumed to have been subdivided into packets prior to multiplexing. Each time a packet is sent, that is, appended to the end of the multiplex created by the multiplexer, the multiplexer selects the next packet by using a criterion that includes whether or not any of the decoder buffers corresponding to the n different channels is about to reach a full state. The selection of the next packet determines, if none of these buffers is about to reach a full state, which of the decoder buffers corresponding to the n different channels will become empty first. Sending the next packet to such a buffer in this case keeps the decoder buffers balanced. The complexity of the determining step depends on how complete a model of decoders is maintained at the multiplexer. The more complete the model, the less computation is involved in determining which channel to send to.

Hence, the multiplexer in one embodiment of the present invention maintains a record of the current level of fullness of the decoder buffers corresponding to each of the n streams being transmitted. All receive tuned to the same channel or stream are assumed to maintain identical levels of buffer fullness, and n decoder buffers or buffer fullness levels are maintained or estimated at the multiplexer. In the embodiment of the method of the present invention illustrated by the flow-chart of FIG. 4A, the channel corresponding to the decoder buffer which will be the first to become empty is determined by maintaining a record of the number of blocks in each buffer and then determining the one with the least number of blocks, where a block is a grouping of data corresponding to a fixed time duration of presentation. The size of a block can be selected to correspond to any time duration without deviating from the scope of this invention.

Referring to the flow-chart of FIG. 4A, the method starts at step 401. At step 403, the method determines if all decoder buffers are full or approaching a full state. Normally, this is not the case and the method proceeds to select, at step 405, the next channel from which to send the next packet. To balance the decoder buffers, at step 405, the channel with the fewest number of blocks in its decoder buffer is selected. This channel corresponds to the channel whose decoder buffer would empty first. For that selected channel, the method checks, in step 407, if the corresponding decoder buffer is approaching a full state. If it is full or approaching a full state, another channel is selected at step 411. To balance the decoder buffers, the channel whose decoder buffer has the next fewest number of blocks in it, is selected in step 411. The method then checks again, in step 407, if the corresponding decoder buffer is approaching a full state. This loop of steps 407 and 411 is continued until a channel is selected that is not full or approaching a full state. At step 409, the method sends the next packet for the selected channel. That is, the method appends the next packet to the end of the multiplex.

It will be understood by one in the art that a selected decoder buffer may indeed be found in step 407 to be too full to accept its next available packet to be sent, even though, according to the method of the present invention, each of the decoder buffers will generally be balanced in the sense that each buffer holds approximately the same amount of data when measured in units of time. The reason for this potential overflow might be that the actual quantity of data (vs. units of time) in each buffer may vary depending on the relative complexities of the different underlying video streams at that point in time; that is, the quantity of data in the buffers may vary depending on the levels of compression of the corresponding streams at that point in time. Hence, it is possible that the channel with the least units of time in its buffer may reach a full state while the other buffers are still relatively empty. The method of the present invention avoids sending a packet to any buffer that is too full to accept its next available packet to be sent.

It is possible at step 403 that all decoder buffers will be found to be full. In such a case, the method will send an alternate packet. In the preferred embodiment, the alternate packet is a fill packet of stuffing bits. As has been stated, fill packets are ignored by the receiver.

In an alternate embodiment of the method of the present invention, step 403 is not carried out explicitly at the beginning. Rather, if after continued repetition of steps 407 and 411, no channel with a decoder buffer that is not approaching a full state is found, an alternate packet, such as a fill packet, is selected as the next packet to send in step 409.

To reduce the complexity of the decoder models maintained at the multiplexer, according to one embodiment, the determination at step 405 of the decoder buffer that will empty first is done by looking at decoding time stamps of the packets of data in the decoder buffers. As defined in the Appendix, in the MPEG standard, a decoding time stamp (DTS) is data that may be present in a packet header, indicating the time that the first unit in the packet is to be decoded, where a unit is an audio frame or video picture. The system clock reference (SCR) is a time stamp in a pack header that defines when a particular byte is to enter the decoder, and thus can be used to set the reference clock of a decoder from time to time. In step 405 of the flow chart of FIG. 4A, the decoder buffer that will be first to empty is the one with the minimum difference between the values of DTS for the last (i.e., most recent) packet in the decoder buffer and the current value of the reference clock of the decoder model. This minimum difference exists for data in the decoder buffer, containing the least amount of time, hence the least number of blocks. In an alternate embodiment, instead of using the current value of the decoder reference clock, the decoder buffer that will be the first to empty is the one with the minimum difference between the values of DTS for the last (i.e., most recent) packet in the decoder buffer and the first (i.e., oldest) packet in that decoder buffer.

Again to reduce the complexity of the decoder models maintained at the multiplexer, according to one embodiment, the method shown in the flow chart of FIG. 4B determines, at step 407 of FIG. 4A, whether the corresponding decoder buffer is too full. The determining method starts either after step 405 or after step 411 of FIG. 4A, in which a particular channel is selected. In step 421, a temporary index, j, is set to the index of the first (i.e., oldest) packet in the decoder buffer for the selected channel i, that index denoted by $J0_i$. At step 423, $ts_{ij}$, the decoding time stamp for the packet corresponding to the index j is compared to either $SCR_i$, the system clock reference (SCR) for the next packet to be transmitted for that channel, or, if the SCR does not exist at that point, to the reference clock of the decoder model. Step 423 thus determines if the packet in the buffer, based on the DTS, has already been removed, in which case (1) in step 425, $B_i$, the current buffer fullness estimate, is reduced by $n_{ij}$, the size of the oldest packet, (2) in step 427, $J0_i$, the index corresponding to the first (oldest) packet is incremented, and (3) the procedure loops back to the beginning step 421. If the oldest packet is determined, at step 423, to still be in the decoder buffer, the effect of sending the next packet is determined, in step 429, by adding mi, the size of the next packet, to $B_i$, the current buffer fullness estimate, and the resulting $B_i$ is compared, in step 431, to $BMAX_i$, the maximum allowed decoder buffer size for the selected channel i. If the buffer fullness $B_i$ is less than the maximum allowed buffer size $BMAX_i$, then (1) at steps 433 the temporary index j is set to be one more than $J1_i$, the index corresponding to the last (most recent) packet in the decoder buffer for selected channel i; (2) $n_{ij}$, the size of the packet corresponding to index j, is set to $m_i$, the size of the next packet; (3) $ts_{ij}$, the decoding time stamp for the packet corresponding to the index j, is set to be $DTS_i$, the DTS for the next packet from channel i; $J1_i$, the index corresponding to the last (most recent) packet in the decoder buffer for selected channel i, is reset to index j, and the method proceeds to step 409 of FIG. 4A, at which a packet is transmitted for the selected channel i. If at step 431, it is determined that the buffer fullness is greater than the maximum allowed, then at step 441, $B_i$, the current estimate of buffer fullness is decremented by $m_i$, the size of the next packet, and the method proceeds to step 411 of the flow chart of FIG. 4A in which another channel is selected.

In the flow chart of FIG. 4B, the steps of incrementing $J0_i$ and $J1_i$ may be carried out modulo K, where K is some sufficiently large constant.

Thus, a method has been disclosed that can be used to multiplex and send encoded video across channels, including fixed-bandwidth channels, while preserving the full quality of the pre-compressed signal.

Description of a Server Apparatus

Figure 5:
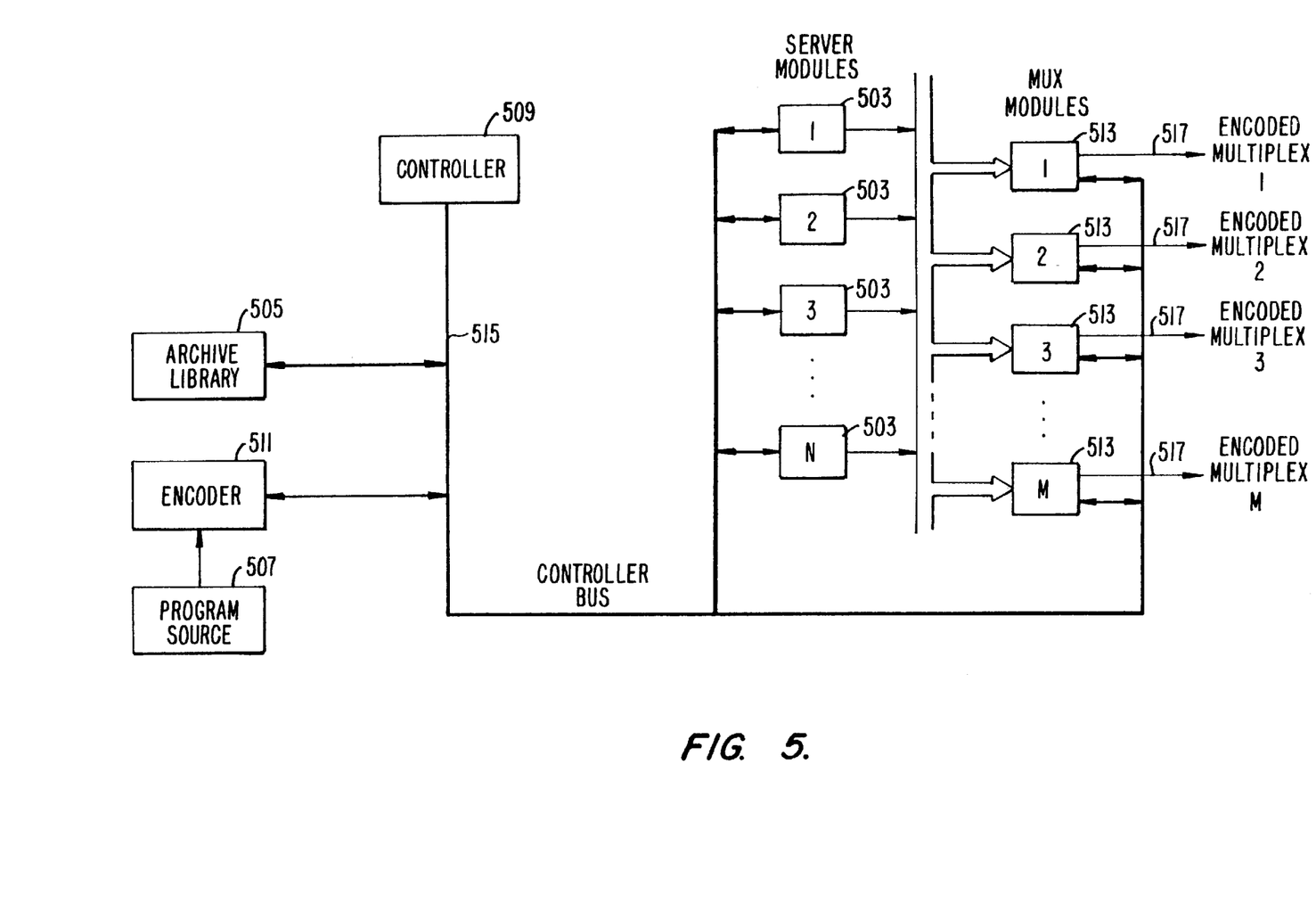
FIG. 5 shows the preferred embodiment of a server system capable of generating encoded multiplexes, using the method of this invention.

The preferred embodiment of a server system capable of generating encoded multiplexes 205 using the method of this invention is shown in FIG. 5. On-line storage for compressed programs is provided by individual server modules 503. For example, each server module may have a hard disk large enough to contain one program that has been compressed using VBR (or other) encoding techniques. Additional off-line storage may be provided by an archive library 505 which may consist of one or more magnetic tape drives and a library of magnetic tapes. The programs stored in this library could also exist in the same compressed format. New program material can be included into the system either by adding a new tape to the archive library or by using a program source 507 such as a Video Tape Recorder (VTR) to supply uncompressed video to an encoder 511. A controller 509 is used to manage the operation of the system. In the preferred embodiment, the controller is a computer. Controller 509 serves as an interface to the operator when entering or modifying programming schedules, controls the transfer of programs between the archive library 505 or encoder 511 and the server modules 503, analyzes programs or maintains files describing the characteristics of each program, and determines how the multiplexes should be formed according to the present invention. The controller instructs an individual MUX module 513 to accept compressed program data from one or more selected server modules 503. Each MUX module 513 inserts fill data when the output data rate falls below the capacity of the channel. If properly instructed by the host, the MUX module 513 will also introduce pauses, insert messages, or other program material supplied by one of the other server modules 503, according to the present invention.

Thus, a method and apparatus has been disclosed for improving channel utilization for distributing multiplexed video programs.

The foregoing description of preferred and alternate embodiments of the invention has been presented for purposes of illustration and description. It is not intended to be exhaustive or to limit the invention to the precise forms disclosed. Obvious modifications or variations are possible in light of the above teachings. The embodiments are chosen and described to provide the best illustration of the principles of the invention and its practical application in order to enable one of ordinary skill in the art to utilize the invention in various embodiments and with various modifications, as are suited to the particular use contemplated. All such modifications and variations are within the scope of the invention as determined by the appended claims.

Appendix: An Introduction to Video Coding and MPEG

A. Terminology

For convenience, several terms used in describing the invention are now defined. The concepts behind the terms listed in this terminology section are explained in the sections that follow. It should be noted that some of these terms may have more than one meaning in the art. The meaning applicable to the description section would be clear from the context to one in the art.

MPEG: The MPEG standard, a set of International Organization for Standardization/International Electrotechnical Commission (ISO/IEC) standards. Two variations of MPEG have been agreed to: MPEG-1, documented in ISO/IEC publications 11172 ("Coding of Moving Pictures and Associated Audio for Digital Storage Media"), and MPEG-2, documented in ISO/IEC publications 13818 ("Generalized Coding of Moving Pictures and Associated Audio Information"). As used herein, MPEG refers to either MPEG-1 or MPEG-2 without distinction.

Remote coding: Encoding programs independently of encoding of any other programs and independently of any multiplexing of the coded streams, either because of remote physical location, or for other reasons.

Frame: The basic unit of audio coding. MPEG audio bit-streams are broken down into frames. The term "frame" is also commonly used for the unit of a video sequence. A video frame often is referred to as a "picture" herein.

Picture: A video frame, the unit of a video sequence.

Pixel: A "picture element" of a picture. In the arts of digital video and video coding, a picture may be thought of as a discretized two-dimensional array of pixels.

Pel: A picture element. The same as a pixel.

Field: In video, a subset of the pixels of a picture transmitted separately. In interlacing, a picture is split into two or more fields. In NTSC and PAL, each field consists of the pixels in alternating horizontal lines of the picture.

Interlacing: The splitting of a picture into two or more fields.

Image coding: The art of image compression.

Color quantization: Reducing the number of bits in a pixel required to represent that pixel. Color quantization also means digitizing the numbers representing the colors of a pixel.

Intra-coding: Image coding which takes into account spatial redundancies in a picture, including color quantization, but which does not use temporal variations from picture-to-picture.

Inter-coding: Image coding which takes advantage of temporal redundancies from picture-to-picture in a video sequence.

Intraframe coding: The same as intra-coding.

Interframe coding: The same as inter-coding.

Motion estimation: Computing the spatial displacement due to motion from picture-to-picture in a video sequence.

Motion compensation: Using motion estimation to compensate for motion from picture-to-picture in a video sequence.

I-picture: In MPEG, a picture that uses purely intra-coding, and thus, is processed independently of other pictures I-frame: Same as an I-picture.

Intraframe coded picture: Same as an I-picture.

P-picture: In MPEG, a picture that is coded using a previous I-picture or a previous P-picture. The compression of P-pictures relies on temporal prediction from previous I- or P-pictures using forward motion estimation and compensation.

P-frame: Same as a P-picture.

Predictively coded picture: Same as a P-picture.

B-picture: In MPEG, a picture coded by a bidirectional motion estimation and compensation from a previous I- or P-picture and a future I- or P-picture.

B-frame: Same as a B-picture.

Bidirectionally coded picture: Same as a B-picture.

Anchor picture: In MPEG, for a P-picture, the I-or P-picture used to predict the P-picture. For a B-picture, either of the adjacent I- or P-pictures, one forward, the other backward in time from the B-picture, used to predict that B-picture backwards and forwards in time, respectively.

Reference pictures: The same as anchor pictures.

Reference frames: The same as anchor pictures.

Variable bit-rate (VBR) encoding: Image coding in which the output bit-rate varies over time to account for the different complexities of the original video scenes from time to time. VBR encoding often is associated with encoding to achieve a uniform picture quality.

MPEG stream: In MPEG, a bit-stream typically containing one or more video streams multiplexed with one or more audio streams and other data, such as timing information.

Program stream: A coded stream for a single video program, usually comprising all video, audio, and other data streams associated with that program. An example is an MPEG stream for a program.

Elementary stream: In MPEG, a video stream, audio stream, or private data stream.

Video stream: The bit-stream of coded video information.

Audio stream: The bit-stream of coded audio information.

Packet: In MPEG, the basic unit of an elementary stream. Packets include a packet header and packet data.

Packet header: In MPEG, a header in each packet. The packet header includes a stream identification code and may include one or more time-stamps.

Pack: In MPEG, the basic unit of MPEG streams. Each pack includes a pack header and packets from one or more elementary streams.

Pack header: In MPEG, the header of a pack, possibly including time stamps.

Time-stamps: In MPEG, information in packs or packets which provide means for synchronization during decoding and presentation to the viewer.

Multiplex-wide operators: In MPEG, operations performed in decoding on packs, including the coordination of retrieval off the DSM or channel, the adjustment of clocks, and the management of buffers.

Stream-specific operations: In MPEG, operations performed in decoding on one elementary stream, including demultiplexing and playback synchronization.

DSM: A general term for Digital Storage Medium, used to denote a digital storage or transmission device or system. In the case of encoding, coded data is sent to a DSM or to a data channel, and, in the case of decoding, coded data is obtained from a DSM or from a data channel.

Source clock reference (SCR): In MPEG, data which might be present in a pack header used to adjust local clocks to a master time base.

Decoding time-stamp (DTS): In MPEG, data that may be present in a packet header which indicates the time that the first unit in the packet is to be decoded (audio frame or video picture).

Presentation time-stamp (PTS): In MPEG, data that may be present in a packet header which indicates the time that the first unit (audio frame or video picture) in the packet is to be presented to the viewer.

System Time Clock (STC): A common time base used to create time stamps. The use of a common time base to unify the measurement of the timing of coded data (SCR) and the timing of the presentation of data (the PTS and DTS fields), ensures correct synchronization and buffer management.

System target decoder (STD): In MPEG, a hypothetical model of a decoder used in encoding to create MPEG streams. Real decoders need not be implemented with the same architecture or timing structure as the STD.

Receiver: A device including a decoder. In general, a receiver includes a decoder, tuner, and demodulator.

Reference clock: A local clock in the decoder.

Channel: In the context of the present invention, a particular program stream. The word channel also has other meanings, for example, a communications channel or data channel, which is a digital medium that stores or transports a digital data.

Channel buffer: The buffer of a decoder tuned to a particular program stream.

Block: In the multiplexing method of the present invention, any arbitrary grouping of data corresponding to a fixed time duration of presentation. In MPEG, a macroblock is a block which is the unit of motion compensation and adaptive quantization, thus representing a fixed amount of spatial data. A macroblock in MPEG further comprises one or more luminance blocks and one or more color difference blocks.

Reorder buffer: In MPEG, a buffer used in a video decoder to store I- or P-pictures while the sequence of pictures is reordered before presentation. This is necessitated often in the presence of B-frames.

Stuffing bits: In MPEG, extra stuffing code-bits that are inserted into a compressed bit-stream for the purpose of increasing the bit-rate of the stream. Stuffing bits are discarded during decoding.

Stuffing bytes: Eight stuffing bits.

MPEG Profile: In MPEG-2, the image/picture resolution. The most common profile for broadcast quality is the main profile.

Main Profile (MP): The MPEG-2 profile for CCIR-601 video.

MPEG Level: In MPEG-2, a set of minimum specifications and a subset of MPEG-2 features.

Medium Level (ML): A common MPEG-2 level.

MP@ML: In MPEG-2, MP and ML compliance. An MP@ML compliant decoder has at least 1.8M bits of decoder buffer storage.

B. Digital Video Coding

A video program typically is organized as an ordered sequence of frames, each frame a scene at a particular point in time. It should be noted that the word "frame" is also used in the art of audio-compression and in the MPEG standard to refer to a basic unit of compressed audio. For that reason, the word "picture" is also used herein to indicate a video frame. Each video frame may be thought of as discretized into a two-dimensional array of picture elements (called pixels or pels), and may be split into two or more fields, each field consisting of a subset of the pixels in the picture. Such splitting is called interlacing. In the NTSC (U.S.A and Japan), PAL and SECAM (elsewhere) broadcast television standards, for example, each video frame consists of two fields, and each field consists of the pixels in alternating horizontal lines of the picture.

Each pixel contains information on how to reproduce the color (hue and saturation) and brightness, and this data may be expressed in various ways. One way is as red, green, and blue ("RGB") values corresponding to the relative amounts of red, green, and blue primaries needed to reproduce the color and brightness. Cathode ray tubes common in television displays have guns that produce red, green, and blue on the screen in response to voltages in the guns. The data can also be expressed at each pixel as intensity data (e.g., luminance) and color data, where the color data is expressed in chrominance coordinates, in hue and saturation coordinates, or some other way. Techniques are known for converting between the various ways of representing pixel information.

The information in each pixel can be represented digitally. Thus, a video program can be converted into a digital data stream which consists of an ordered sequence of bits describing the pixel values in each video frame. Similarly, audio associated with the program can be converted into digital data, and can be identified with the video on a picture-by-picture basis.

It is well known in the art that video data can be compressed. First, the number of bits required to represent each individual pixel may be reduced on a pixel-by-pixel basis. That is, the data of each pixel is processed (reduced) without reference to the data of any other pixel. Second, the number of bits required to represent a field or a picture can be reduced by taking advantage of spatial redundancies in the field or picture. For example, regions of uniform, slowly, or smoothly varying color or brightness may be represented by fewer bits (i.e. less data) than regions of many changes and edges. Third, the number of bits required to represent a sequence of pictures may be reduced by taking advantage of temporal redundancies—areas in the pictures of a sequence that vary slowly or hardly at all in time. The art of image compression also is called image coding. The first method above commonly is called color quantization, the second is called intraframe coding or intra-coding and typically includes color quantization, and the third is called interframe coding or inter-coding and typically, but not necessarily, includes intra-coding.

C. The MPEG Video Coding Standard

The preferred embodiment of the present invention is for video streams which have been compressed in accordance with the MPEG standard. As will be understood to one in the art, the present invention may also be used with video streams that have been compressed using other compression schemes.

The video part of the MPEG standard uses motion compensated predictive coding, the discrete cosine transform (DCT) and adaptive quantization, each of these operating on images on a block-by-block basis. Motion estimation refers to the process of computing the spatial displacement (in the form of motion vectors) from picture to picture, and is usually done by measuring the motion of blocks of pixels from picture to picture. Motion compensation uses the resultant motion vectors to compensate for the motion. MPEG uses both forward motion estimation (in which the estimation is of the future referenced to the past), and backward motion estimation (in which the estimation is of the past referenced to the future). Forward and backward motion estimation are also combined to produce bidirectional motion estimation.

Video frames to be compressed typically consist of an array of luminance pixels, where luminance is denoted by Y, and two arrays of chrominance pixels, where the chrominance signals are denoted by $C_r$ and $C_b$, respectively.

According to the MPEG compression method, video frames (pictures) are classified into one of three types: I-frames, also called I-pictures and intraframe coded pictures; P-frames or P-pictures, also called predictively coded pictures; and B-frames or B-pictures, also called Bidirectionally coded pictures. The three types of video frames differ in their use of motion estimation.

I-pictures use purely spatial compression and are processed independently of other pictures. Thus, I-pictures are processed entirely by intraframe operations and only a moderate level of compression is achieved. On the other hand, a complete picture can be generated from an I-picture alone.

P-pictures and B-pictures also use predictive coding, so can be thought of as dependent pictures.

P-pictures are coded using previous I-pictures or previous P-pictures. The compression of P-pictures relies on temporal prediction from previous I- or P-pictures using motion compensation. Only forward motion estimation/compensation is used in the temporal prediction. The I- or P-picture from which a P-picture is temporally predicted is called the anchor picture to the P-picture. It is also called the reference picture or reference frame.

B-pictures are coded by a bidirectional motion compensated predictive encoder using the next "future" I- or P-picture for backwards prediction and the previous I- or P-picture for forward prediction. The two adjacent I- or P-pictures from which a B-picture is temporally predicted are thus called anchor pictures of the B-picture. The B-picture temporal prediction uses motion compensation in forward and/or backward directions. B-pictures are never used to predict other pictures. Due to the dependence of B-pictures on the two adjacent anchor pictures, B-pictures alone do not contain sufficient data from which to generate a recognizable picture.

In accordance with the MPEG standard, pictures are arranged in ordered groups. The standard, allows the encoder to choose the frequency and location of I-pictures. A group of pictures is intended to assist random access into the sequence, thus the first coded picture in a group is normally an I-picture. A typical group then is a series of pictures which might include, as an example, an I-picture as the first picture, P-pictures distributed following every third picture, and a B-picture between every "I and P" and "P and P" sequence. Thus, a typical display order of picture types consistent with this example, might include an I-picture every fifteenth frame, each I-picture followed by two B-pictures, then a sequence of a P-picture followed by two B-pictures, until the next group starts with an I-picture. That is, the display order of I B B P B B P B B P B B P B B I B B P B B P B B . . . A thirty picture-per-second environment, which includes an I-picture every fifteenth frame, corresponds to having an independent picture every one half-second.

In accordance with the MPEG standard, after the video signals are digitized, the digital data is organized into macroblocks. A macroblock is the unit of motion compensation and adaptive quantization. A number of macroblocks comprise a picture. Each macroblock defines a predetermined spatial region in a picture, and contains luminance and chrominance information.

The MPEG proposal provides for the arrangement of macroblocks into slices. A slice is an integer number of consecutive macroblocks from a raster of macroblocks. A slice represents the boundary within which differential coding of macroblock parameters, e.g., DC coefficients of a DCT, and motion vectors, is performed. Each slice has its own header information, can be independent of other slices, and each contains at least one macroblock. Slices do not overlap. The position of slices may change from picture to picture. The first slice starts with the first macroblock in the picture and the last slice ends with the last macroblock in the picture. The first macroblock in a slice has its macroblock parameters, e.g., DC coefficients of a DCT (if intraframe coded) and motion vectors, differentially coded from a constant value. Each subsequent macroblock in a slice has its macroblock parameters measured as an offset from the previous macroblock in the slice. Accordingly, the size of the slice is the minimum size for which a piece of data can be recovered and correctly decoded. If part of a slice is lost, it may not be possible to decode the differences in motion vectors or the DC coefficients contained in the remaining part of the slice.

A macroblock comprises four 8×8 luminance blocks ($Y_0$, $Y_1$, $Y_2$, $Y_3$) and two 8×8 color difference blocks ($C_r$ and $C_b$). The four luminance blocks ($Y_0$, $Y_1$, $Y_2$, $Y_3$) and two color difference blocks ($C_r$, $C_b$), which form a single macroblock, are used to encode a 16×16 picture element array covering the same spatial region in a picture. As described above, a macroblock serves as the smallest unit of motion compensation and adaptive quantization.

In accordance with the MPEG standard, motion-compensated predictive coding is carried out by calculating motion vectors for every macroblock in a P-picture or B-picture. MPEG compression usually encodes motion vectors on a macroblock basis, but does not specify the technique for computing them. Thus, a variety of different motion estimation techniques can be implemented consistent with the MPEG standard. One technique, for example, is to compute motion vectors from the picture-to-picture correlation of blocks of pixels in the luminance signal, resulting in a motion vector for the luminance component of the macroblock.

The best mode for encoding each macroblock is selected. Within a given picture, each macroblock is coded in one of several different modes. The intraframe coding mode refers to macroblock coding in which only spatial information is used. Conversely, the interframe coding modes (forward motion, backward motion, and bidirectional motion) refer to macroblock coding in which information from pictures other than the current picture is used in the coding, typically for temporal prediction in motion-compensated predictive coding. For I-picture macroblocks, only intraframe coding mode is available.

In a typical encoder, not specified by the MPEG standard, P-picture macroblocks are first checked to determine if interframe coding without motion compensation is appropriate. This decision is made by computing the luminance energy of a forward prediction residual for the macroblock that results from an interframe coding without motion compensation, and comparing it to a threshold value. If the residual energy is below the threshold, then the macroblock will be coded without motion compensation. Otherwise, the residual macroblock from interframe coding with forward motion compensation will be derived and used to determine if inter-coding or intra-coding is to be used, the last step in the coding mode selection.

B-picture macroblocks are similarly processed to determine whether interframe coding is appropriate. Since B-pictures may be bidirectionally coded, interframe coding can be either forward or backward, based on the preceding and following anchor (i.e., I- or P-) pictures. It may also be based on the average of those macroblocks from the preceding and the following anchor pictures. In interframe coding using motion compensation, there are three possible modes: forward, backward, and bidirectional. The choice of coding mode for B-picture macroblocks may be determined on the basis of luminance prediction residual energy.

The final step in the coding mode selection for both P- and B-picture macroblocks is to choose between interframe coding and intraframe coding. Generally, P-pictures and B-pictures are encoded using interframe encoding. This selection could be made by comparing the luminance energy of the original macroblock to the energy of the luminance interframe (with or without motion compensation) prediction residual macroblock. If the original macroblock has less energy than the prediction residual macroblock, the intraframe coding mode is selected.

After the motion vectors have been calculated, each macroblock is transform encoded. Thus, the macroblocks are transformed from pixel domain to the DCT coefficient domain. The picture information in each picture (i.e., pixel values for I-pictures, and residual error after prediction for B- and P-pictures) is transformed using the DCT and then adaptively quantized. For the purpose of performing the DCT, a picture (a video frame) is divided, for example, into blocks of values (i.e., arrays of DCT coefficients).

The DCT process generates blocks of DCT coefficients in a zigzag-scanned format (i.e., the low-frequency coefficients are followed by the higher frequency coefficients). This zigzag scan arrangement facilitates the subsequent run-length coding process. The DCT coefficient for which the frequency is zero in both dimensions is called the DC coefficient.

Next, adaptive quantization is performed on each block of DCT coefficients. After adaptive quantization has been applied to the DCT coefficients, the coefficients undergo further compression involving such known techniques as differential coding, run-length coding, and variable length coding. As a result, the video compression encoder module produces encoded data in the form of variable length code words, which includes information concerning the selected mode of encoding and any motion vectors needed for decoding. Various headers are also included in the encoded bit-stream which provide information such as the picture size in terms of pixels per line and a pixel aspect ratio. The video compression encoder module also outputs information that states which picture the encoded data represents and which macroblock and slice the encoded data represents.

The code words are then further encoded with other MPEG-specific data needed to provide reliable delivery of the variable length encoded compressed video stream.

D. The MPEG Audio Coding Standard

MPEG also includes an audio coding standard. MPEG-1 audio supports mono, stereo, and a dual-mode with two separate channels, useful, for example, for bilingual programs, and a mode called joint stereo, in which inter-channel (left-right) dependencies are also used for bit-rate reduction. In the first stage of MPEG-1 audio compression, an audio signal is converted into spectral subband components, then each subband is quantized. Psychoacoustic models can be used in the encoding process. MPEG-2 adds multichannel support as dual standards: MPEG-1 backwards-compatible coding and nonbackwards-compatible coding.

MPEG audio bit-streams are broken down into units called frames. An MPEG-1 audio stream consists of variable length frames, each frame starting with an MPEG-1 header, followed by the MPEG-1 audio signal, then followed by a variable-length field, which is reserved for ancillary data and ignored by MPEG-1 decoders.

The word "frame" in this context is not to be confused with a video frame. For that reason, the word "picture" also is used herein to indicate a video frame.

A backwards compatible MPEG-2 audio stream has frames which include the necessary MPEG-2 multichannel extension signals in the fields of MPEG-1 frames for ancillary data.

This invention deals with complete MPEG streams including both video and audio. Details are provided herein only for dealing with the video stream, because, for example, it is the determining or limiting part of processing the audio consistent with the method of the present invention, which would be straightforward to one in the art.

E. Audio/Video Synchronization and MPEG Receivers

A complete MPEG stream consists of the MPEG video stream, the MPEG audio stream, and other data, such as timing information, all combined and multiplexed together to form a single stream suitable for digital transmission or storage. The MPEG standard imposes syntactical and semantic rules to enable synchronized playback. The standard does not specify the exact architecture or implementation of encoders or decoders, but does specify bit-stream properties and performance requirements that need to be met, such as minimum clock tolerances.

The term program stream is used herein to indicate a coded stream, such as an MPEG stream, for a single program, including the video and audio. Thus, a program stream may consist of the MPEG stream of a digitized motion picture, a digitized terrestrial, cable or satellite television program, or different time segments of the same motion picture or television program.

The video stream, audio stream, etc. are called elementary streams. An MPEG stream thus consists of one or more elementary streams multiplexed together. Data from each elementary stream is stored in units called packets, which typically are serialized in that stream. A packet consists of a packet header followed by packet data. The packet header begins with a start-code, and also identifies the stream to which the packet data belongs. The packet header may also include one or more time-stamps to indicate the timing of the event represented by the packet data. The packet data contains a variable number of contiguous bytes from one elementary stream, e.g., audio, video, or other data.

Packets are organized together into packs. Packs may contain packets from more than one elementary stream, for example, from both the audio and the video stream, and so are used for multiplex-wide operations in decoding. This is in contrast to operations on packet data, called stream-specific operations which reflect the fact that the data in a packet is from one specific elementary stream. A pack commences with a pack header, and may be followed by one or more packets. The pack header may include a time-stamp called the source clock reference (SCR), which specifies the exact time at which the SCR data byte (and thus each other byte) is to enter the decoder from the digital storage medium (the DSM) or the data channel. This target arrival schedule serves as a reference for clock correction and/or for managing buffers in the decoder. The first pack in any stream also may convey information on the maximum data rate and the number of channels in the multiplex.

Thus, multiplex-wide operations performed on packs include the coordination of data retrieval off the DSM or channel, the adjustment of clocks, and the management of buffers.

The two principal stream-specific operations are demultiplexing and synchronizing the playback of multiple elementary streams. Demultiplexing reconstitutes elementary streams from the multiplexed streams using the stream identification codes contained in packet headers. Elementary streams in addition to audio and video streams may include private, reserved, and padding streams.

Synchronization among multiple streams is effected with time-stamps which may be present in packet headers. Presentation time-stamps (PTS) and decoding time-stamp (DTS) fields are used in packet headers for synchronization of audio and video. The PTS is the time at which the first unit (audio frame or video picture) in the packet data is to be presented to the viewer, and the DTS is the time that the first unit (audio frame or video picture) in the packet data is to be decoded. All time-stamps, including those in pack headers, are adjusted during encoding to a master time base called the system time-clock (STC). The use of a common time base to unify the measurement of the timing of coded data (SCR in the pack header), and the timing of the presentation of data (the PTS and DTS fields in packet headers) ensures correct synchronization and buffer management. SCR, PTS, and, if used, DTS fields are inserted during encoding at internals not necessarily equal, but not to exceed some specified value—0.7 seconds in MPEG-1. Also, in MPEG-1, these time stamps are in units of 90 kHz.

A decoding system, including all of the synchronized decoders and the source of the coded data, must have exactly one independent time-master. This fact is a natural result of the requirement to avoid over-flow and underflow in finite size buffers, while maintaining synchronization of the presentation of data. All other synchronized entities must slave the timing of their operation to the time-master. If a decoder attempts to have more than one simultaneous time-master it may experience problems with buffer management or synchronization. Thus, playback of several streams is synchronized by adjusting the playback of all streams to a single master time base rather than by adjusting the playback of one stream to match that of another. The master time base may be one of the individual stream's decoders' clocks, for example, the video decoder or the audio decoder, it may be the DSM or channel clock, or it may be a separate. STC such as some external clock. The time-master must communicate to the others the correct value of the STC. A time slave will typically maintain a local STC which is incremented nominally at 90 kHz (for MPEG-1) between updates or corrections. In this way, each entity has a continuously updated value of the STC which is nominally correct and which it uses to compare with the time-stamps.

The MPEG stream properties and semantics defined above are set out in the MPEG standard using a hypothetical reference model of decoding in the form of a hypothetical decoder called the system target decoder (STD). The STD model is used by encoders to create MPEG streams, but real decoders need not be implemented with the same architecture or timing structure as the STD.

The STD model consists of a demultiplexer followed by, for each elementary stream, a first-in first-out (FIFO) buffer followed by a decoder. In the model, data present in headers of the packs or packets, but not part of packet data (e.g., SCR, DTS, PTS, packet lengths, etc.) is not delivered to any of the stream buffers, but may be used to control the system. In one preferred embodiment of the present invention, such data is used to optimize the efficiency of transmitting VBR data.

In the STD model, the data output of the buffer is decoded instantaneously, and may be delayed in a reorder buffer before being presented to the viewer at the output of the STD. Reorder buffers are used only for video decoding in order to store I-pictures and P-pictures while the sequence of presentation pictures is reordered before presentation. This is often necessitated in the presence of B-frames.

As an example, consider a decoder for a video stream which includes an internal clock. The buffer at any time includes packets of the stream. The output of the buffer is connected to the decoder. The decoder needs to know when to decode the next packet. If a packet header has a DTS, then the decoder takes that packet when the DTS is less than or equal to the decoder clock. If a packet does not contain a DTS, then the decoder takes that packet at the next time instant that the decoder expects a packet, based on previous packets decoded.

Thus, MPEG streams are formed containing elementary streams (video and/or audio) multiplexed together.

F. MPEG-2 Profiles and Levels

The MPEG-2 Standard defines classes of image resolution and sound quality (the "profile") and a minimum subset of specifications and features of the MPEG standard (the "level"). For example, main profile ("MP") covers the common CCIR-601 standards of a resolution of 704 pixels per line for 525 line/60 Hz systems (NTSC) and 625 line/50 Hz systems (PAL and SECAM). Low profile ("LP") covers the SIF resolution which is half of CCIR-601 and iscommonly used in video conferencing, while high profile ("HR") is usually reserved for high definition television (HDTV). There are three levels, low level (LL), medium level (ML), and high level (HL). A decoder meeting MPEG-2 compliance specifications must meet these minimum specifications and offer at least the subset of MPEG-2 features of that level. For example, the most common decoder is the MP@ML compliant decoder. It must have a decoder buffer that is at least 1.8M bits in size. An MP@HL compliant decoder must have a larger decoder buffer and must be able to implement many of the scaleable features of MPEG-2.

What is claimed is:

1. A method for multiplexing a set of n program streams to form a multiplex, each program stream in said set having a corresponding channel, each program stream in said set decodeable by a corresponding decoder, each corresponding decoder including a corresponding decoder buffer, said method comprising the steps of:
   (a) partitioning each program stream in said set into packets;
   (b) determining a next packet to append to said multiplex by selecting a channel that has a decoder buffer that is not approaching a full state; and
   (c) appending said next packet to said multiplex.

2. The method of claim 1, wherein said determining step comprises a loop that terminates when a channel is selected that has a decoder buffer that is not approaching a full state, said loop comprising:
   (a) selecting a next channel; and
   (b) evaluating whether or not the decoder buffer of said next channel is approaching a full state.

3. The method of claim 2, wherein said step of selecting said next channel substantially balances the decoder buffers.

4. The method of claim 3, wherein said full state is the state of not having enough room for the next available packet to be sent of said next channel.

5. A method for multiplexing a set of n program streams to form a multiplex, each program stream in said set having a corresponding channel, each program stream in said set decodeable by a corresponding decoder, each corresponding decoder including a corresponding decoder buffer, said method comprising the steps of:
   (a) partitioning each program stream in said set into packets;
   (b) determining a next packet to append to said multiplex by selecting a channel that has a decoder buffer that is not approaching a full state; and
   (c) appending said next packet to said multiplex;
   wherein said determining step includes a loop that terminates when a channel is selected that has a decoder buffer that is not approaching a fall state, said loop including:
      (a) selecting a next channel; and
      (b) evaluating whether or not the decoder buffer of said next channel is approaching a full state;
   wherein said step of selecting said next channel substantially balances the decoder buffers;
   wherein said full state is the state of not having enough room for the next available packet to be sent of said next channel;
   further including the steps of deciding if all decoder buffers are approaching a full state, and, if all buffers are approaching a full state, assigning an alternate packet to said next packet.

6. The method of claim 5, wherein said alternate packet is a fill packet.

7. The method of claim 5, wherein said deciding step decides if said loop does not terminate after n cycles.

8. The method of claim 4, wherein said step of evaluating includes estimating the level of fullness of the decoder buffer corresponding to the program stream of said next packet.

9. The method of claim 4, wherein substantially balancing keeps substantially the same time duration stored in each decoder buffer.

10. A method for multiplexing a set of n program streams to form a multiplex, each program stream in said set having a corresponding channel, each program stream in said set decodeable by a corresponding decoder, each corresponding decoder including a corresponding decoder buffer, said method comprising the steps of:
(a) partitioning each program stream in said set into packets;
(b) determining a next packet to append to said multiplex by selecting a channel that has a decoder buffer that is not approaching a full state; and
(c) appending said next packet to said multiplex;
wherein said determining step includes a loop that terminates when a channel is selected that has a decoder buffer that is not approaching a full state, said loop including:
(a) selecting a next channel; and
(b) evaluating whether or not the decoder buffer of said next channel is approaching a full state;
wherein said step of selecting said next channel substantially balances the decoder buffers;
wherein said fall state is the state of not having enough room for the next available packet to be sent of said next channel;
wherein substantially balancing keeps substantially the same time duration stored in each decoder buffer;
wherein said step of evaluating includes using one or more time stamps in the program stream of said next packet.

11. The method of claim 10, wherein said step of selecting said next channel includes using one or more time stamps in the program stream of said next channel.

12. The method of claim 4, wherein said packets are fixed length packets.

13. The method of claim 4, wherein said program streams are segments of a compressed program.

14. An apparatus for multiplexing a set of n program streams to form a multiplex, each program stream in said set being decodeable by a corresponding decoder, each program stream in said set partitioned into packets, each corresponding decoder including a corresponding decoder buffer, said apparatus comprising:
(a) a means for determining a next packet of said packets to append to said multiplex, said determining means including means for ascertaining whether or not a decoder buffer is approaching a fall state;
(b) a means for determining a next packet into said packets to append to said multiplex, said determining means, including means for balancing the decoder buffers; and
(c) a means coupled to said determining means, for appending said next packet to said multiplex.

15. An apparatus for multiplexing a set of n program streams to form a multiplex, each program stream in said set being decodeable by a corresponding decoder, each program stream in said set partitioned into packets, each corresponding decoder including a corresponding decoder buffer, said apparatus comprising:
(a) a means for determining a next packet of said packets to append to said multiplex, said determining means including means for ascertaining whether or not a decoder buffer is approaching a full state;
(b) a means for determining a next packet into said packets to append to said multiplex, said determining means, including means for balancing the decoder buffers; and
(c) a means coupled to said determining means, for appending said next packet to said multiplex,
wherein said means for ascertaining also ascertains whether or not a buffer is about to empty.

16. The apparatus of claim 15, wherein said means for determining further comprises a means for reading time stamps, said reading means coupled to said means for ascertaining.

17. The apparatus of claim 15, wherein said means for determining includes means for substantially balancing the decoder buffers.

18. A server system for generating multiplexes of a set of encoded program streams, said server system comprising:
(a) a controller;
(b) a plurality of server modules, each server module in said plurality coupled to said controller, each server module in said plurality being capable of storing the compressed data of a program stream, said compressed data partitioned into packets, and each server module in said plurality having an output port for said compressed data;
(c) a set of one or more MUX modules, each MUX module coupled to said controller, each MUX module in said set being capable of generating a multiplex, and each MUX module in said set having an input port for compressed data; and
(d) a data transmission means coupled to the output ports of said server modules and to the input ports of said MUX modules;
whereby
said transmission means under control of said controller enables a selected MUX to form said multiplex of the compressed data from the output ports of a selected subset of one or more server modules, the compressed data from each server port in said selected subset being decodeable by a decoder corresponding to said each server port, each corresponding decoder including a corresponding decoder buffer, and
said controller determines a next packet for said selected MUX module to append to said multiplex by selecting a channel that has a decoder buffer that is not approaching a full state.

19. The server system of claim 18, wherein said controller also determines said next packet according to substantially balancing the decoder buffer.

20. The server system of claim 18, wherein said controller comprises a computer.

21. The server system of claim 18, wherein said transmission means comprises a bus.

22. A method of multiplexing a set of n program streams to form a multiplex, each program stream being decodeable by a corresponding decoder having a corresponding decoder buffer, the method comprising the steps of:
partitioning each program stream into packets;
maintaining a record of a current level of fullness of each decoder buffer;
determining a next packet to append to the multiplex by selecting a program stream that the record indicates has a corresponding decoder buffer that is not approaching a full state and using a packet from the selected program stream as the next packet; and
appending the next packet to the multiplex.

23. A method in accordance with claim 22, wherein the step of determining a next packet to append to the multiplex further comprises the step of:

determining from the record which decoder buffer will be empty first.

24. A method in accordance with claim 22, wherein the step of maintaining a record of a current level of fullness of each decoder buffer further comprises the step of:

recording time stamps associated with packets in the program streams.

25. A method in accordance with claim 24, wherein the step of determining a next packet to append to the multiplex further comprises the step of:

comparing the recorded time stamps with a reference clock.

26. A method of multiplexing a set of n program streams to form a multiplex, each program stream being decodeable by a corresponding decoder having a corresponding decoder buffer, the method comprising the steps of:

partitioning each program stream into packets;

maintaining a record of a current level of fullness of each decoder buffer;

determining a next packet to append to the multiplex by checking whether the record indicates that all decoder buffers are full;

selecting a program stream and using a packet therefrom as the next packet in response to the record indicating that not all decoder buffers are full; and appending the next packet to the multiplex.

27. A method in accordance with claim 26, further comprising the step of:

using an alternate packet as the next packet in response to the record indicating that all of the decoder buffers are full.

28. A method in accordance with claim 27, wherein the alternate packet is a fill packet.

29. A method in accordance with claim 26, wherein the step of selecting a program stream further comprises the step of:

determining from the record which decoder buffer will be empty first.

30. A method in accordance with claim 26, wherein the step of maintaining a record of a current level of fullness of each decoder buffer further comprises the step of:

recording time stamps associated with packets in the program streams.

31. A method in accordance with claim 30, wherein the step of determining a next packet to append to the multiplex further comprises the step of:

comparing the recorded time stamps with a reference clock.

32. An apparatus for multiplexing a set of n program streams to form a multiplex, each program stream being decodeable by a corresponding decoder having a corresponding decoder buffer, comprising:

means for partitioning each program stream into packets;

means for maintaining a record of a current level of fullness of each decoder buffer;

means for determining a next packet to append to the multiplex by checking whether the record indicates that all decoder buffers are full;

means for selecting a program stream and using a packet therefrom as the next packet in response to the record indicating that not all decoder buffers are full; and means for appending the next packet to the multiplex.

33. An apparatus in accordance with claim 32, further comprising:

means for using an alternate packet as the next packet in response to the record indicating that all of the decoder buffers are full.

34. An apparatus in accordance with claim 33, wherein the alternate packet is a fill packet.

35. An apparatus in accordance with claim 32, wherein the means for selecting a program stream further comprises:

means for determining from the record which decoder buffer will be empty first.

36. An apparatus in accordance with claim 32, wherein the means for maintaining a record of a current level of fullness of each decoder buffer further comprises:

means for recording time stamps associated with packets in the program streams.

37. An apparatus in accordance with claim 36, wherein the means for determining a next packet to append to the multiplex further comprises:

means for comparing the recorded time stamps with a reference clock.

38. A server system for generating multiplexes of encoded program streams, each program stream being decodeable by a corresponding decoder having a corresponding decoder buffer, the server system comprising:

a data transmission bus;

a plurality of server modules that each have an output coupled to the data transmission bus, each server module being configured to store a program stream that has been compressed and partitioned into packets and to provide the program stream to the data transmission bus;

a set of one or more MUX modules that each have a plurality of input ports coupled to the data transmission bus, each MUX module being configured to receive one or more program streams from the data transmission bus and to generate an output multiplex; and a controller coupled to the server modules and to the MUX modules, the controller being configured to route program streams from a subset of one or more of the server modules to a selected one of the MUX modules, the controller being further configured to maintain a record of a current level of fullness of each decoder buffer and to determine a next packet to append to the output multiplex of the selected MUX module by selecting a program stream from one of the subset of server modules that the record indicates has a corresponding decoder buffer that is not approaching a fall state and using a packet from the selected program stream as the next packet.

39. A server system in accordance with claim 38, wherein the controller is further configured to use an alternate packet as the next packet in response to the record indicating that all of the decoder buffers are fall.

40. A server system in accordance with claim 39, wherein the alternate packet is a fill packet.

41. A server system in accordance with claim 38, wherein the controller selects a program stream by determining from the record which decoder buffer will be empty first.

42. A server system in accordance with claim 38, wherein the controller maintains a record of a current level of fullness of each decoder buffer by recording time stamps associated with packets in the program streams.

43. A server system in accordance with claim 42, wherein the controlled determines a next packet to append to the output multiplex by comparing stamps with a reference clock.

* * * * *